US012230900B1

(12) United States Patent
Lafleur

(10) Patent No.: US 12,230,900 B1
(45) Date of Patent: Feb. 18, 2025

(54) SYSTEM, METHOD AND APPARATUS FOR PROVIDING A CAPACITIVELY FED INVERTED-L MULTIBAND VHF ANTENNA

(71) Applicant: ORBCOMM, INC., Rochelle Park, NJ (US)

(72) Inventor: Phil Lafleur, Ontario (CA)

(73) Assignee: ORBCOMM, Inc., Rochelle Park, NJ (US)

( * ) Notice: Subject to any disclaimer, the term of this patent is extended or adjusted under 35 U.S.C. 154(b) by 4 days.

(21) Appl. No.: 17/979,757

(22) Filed: Nov. 2, 2022

Related U.S. Application Data

(60) Provisional application No. 63/274,934, filed on Nov. 2, 2021.

(51) Int. Cl.
*H01Q 9/04* (2006.01)
*H01Q 21/30* (2006.01)

(52) U.S. Cl.
CPC ......... *H01Q 9/0457* (2013.01); *H01Q 9/0421* (2013.01); *H01Q 9/0442* (2013.01); *H01Q 21/30* (2013.01)

(58) Field of Classification Search
CPC ............... H01Q 1/243; H01Q 1/38-48; H01Q 9/0407-0457; H01Q 21/30
See application file for complete search history.

(56) References Cited

U.S. PATENT DOCUMENTS

| | | | | |
|---|---|---|---|---|
| 9,893,427 | B2 * | 2/2018 | Pajona | H01Q 5/50 |
| 11,050,142 | B2 * | 6/2021 | Puuri | H01Q 1/36 |
| 2004/0095280 | A1 * | 5/2004 | Poilasne | H01Q 9/16 343/702 |
| 2004/0204023 | A1 * | 10/2004 | Desclos | H01Q 1/245 455/90.3 |

* cited by examiner

*Primary Examiner* — Hasan Islam

(57) ABSTRACT

The present invention provides an antenna assembly which includes a capacitively coupled array of two or more inverted-L antennas. According to a preferred embodiment, the antenna assembly preferably may include: a receive resonator, a transmit resonator and a coupled bar which capacitively feeds the resonators. The receive resonator is preferably formed as an inverted-L antenna and the transmit resonator is preferably formed as an inverted-L antenna.

19 Claims, 8 Drawing Sheets

SYSTEM, METHOD AND APPARATUS FOR PROVIDING A CAPACITIVELY FED INVERTED-L MULTIBAND VHF ANTENNA

RELATED APPLICATIONS

The present application is a continuation-in-part of U.S. Patent Application No. 63/274,934 filed Nov. 2, 2021.

BACKGROUND OF THE PRESENT INVENTION

1. Field of the Invention

The present invention relates to antennas for wireless communication, and more particularly, to capacitively fed, inverted-L, multiband VHF devices and systems.

2. Description of Related Art

It has become increasingly important to minimize the sizes and profiles of tracking devices in modern telematics systems. At the same time, the Chu limit sets a lower limit on the Q factor for small antennas and there is a resulting limit to the bandwidth that can be sent to and received from small antennas. This is a fundamental limit that sets a minimum size for any antenna used at a given frequency within a given bandwidth. Accordingly, as antenna dimensions shrink, the available bandwidth decreases as does device range, bitrate and radiation efficiency.

To overcome these limitations, several techniques have been used in the prior art to allow for smaller antennas to effectively function. These solutions include adding multiple resonators and implementing various circuits to tune the resonators. For example, WO2016061536A8 to Caporal teaches a dual-resonant radiating system, a radiating coupler and a ground plane extension in communication with a ground plane. Caporal teaches that one or both of the radiating coupler and the ground plane extension are tunable to tune the dual-resonance frequency response. Likewise, WO2005011055A1 to Boyle teaches a communications device which includes a planar inverted-L antenna and a feed which includes an L-C resonator circuit for tuning the antenna. Boyle further teaches a dual band antenna with one antenna inductively tuned at a lower frequency and a second higher frequency antenna tuned capacitively.

For additional tuning, U.S. Pat. No. 7,345,634B2 to Ozkar teaches a multiband planar inverted F antenna which utilizes a capacitive element, and a tuning area that allows the antenna to be tuned independently of the capacitive element. US2017170555A1 to Van Gils teaches an antenna assembly having a first antenna operating at a first frequency and a second antenna operating at a second frequency. As taught by Van Gils, the second antenna has a capacitive coupling element and a resonance element. The capacitive coupling element feeds an input signal to the resonance element via capacitive coupling to resonate the resonance element at the second frequency.

U.S. Pat. No. 9,196,955B2 to Higaki teaches another antenna design which includes feed antenna elements arranged in a radial fashion around the feeding point, a selector switch, and parasitic elements arranged correspondingly to the feed antenna elements. Similarly, U.S. Pat. No. 8,629,813B2 to Milosavijevic teaches an adjustable multi-band planar antenna connected by a multiple-way switch to at least two alternative points of the radiator element.

Milosavijevic teaches changing a given feed point to tune the resonance frequencies and change the operating bands of the antenna.

In all of the prior art solutions, the dimensions of the resulting antennas are confined to specific bandwidths and operating profiles including requiring high power levels. Additionally, the solutions of the prior art result in significant cross-coupling and the like. None of the prior art teaches or suggest an antenna design which has sufficient efficiency and bandwidth within the VHF spectrum when they are significantly reduced in size and power. To overcome these limitations, the present invention teaches a capacitively fed inverted-L multiband VHF antenna array which is capable of significantly improved performance at reduced scale.

DESCRIPTION OF THE PREFERRED EMBODIMENTS

Figure 1:
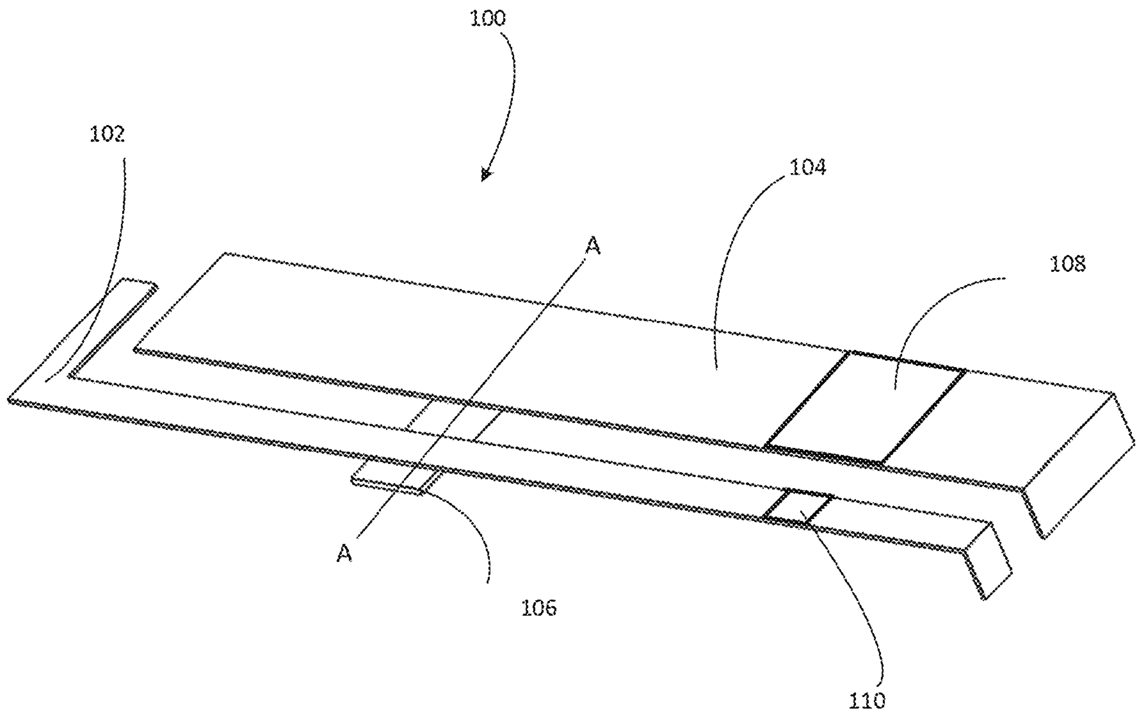
FIG. 1 is a perspective view of an antenna assembly according to a first preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively, or simultaneously) and selected steps may be omitted. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

The communication elements of the present invention as discussed below may include a wide variety of signal or data transmitting and receiving circuits, such as antennas, amplifiers, filters, mixers, oscillators, digital signal processors (DSPs), and the like whether illustrated or omitted.

Referring now to FIGS. 1-9, aspects of an exemplary capacitively fed inverted-L multiband VHF antenna system in accordance with the present invention shall now be discussed. As should be understood, the systems disclosed in FIGS. 1-9 are exemplary systems onto which the features of the present invention may be integrated. Accordingly, the figures are intended to be illustrative and any of a variety of systems may be used with the present invention without limitation.

Figure 2:
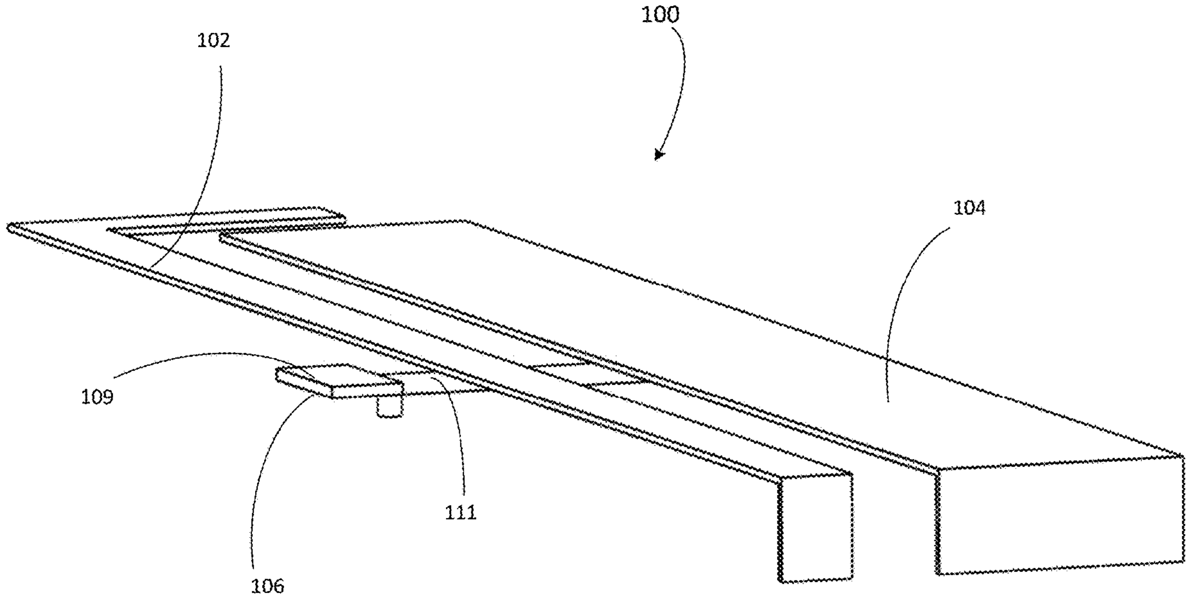
FIG. 2 is a second perspective view of the antenna assembly shown in FIG. 1.

Referring now to FIGS. 1 and 2, first and second perspective views of an antenna assembly 100 according to a first preferred embodiment of the present invention shall now be discussed. As shown in FIGS. 1 and 2, the first exemplary antenna assembly 100 may preferably be formed as a capacitively coupled array of two or more inverted-L antennas. In the example shown, these may include at least one receive resonator 102 and at least one transmit resonator 104. As shown, each resonator 102, 104 may preferably be capacitively fed by at least one capacitively coupled element such as the capacitively coupled bar 106 shown. According to a further preferred embodiment, the resonators 102, 104 may preferably be formed as inverted-L antennas. As shown, each resonator 102, 104 may preferably be attached to an inductor element 108, 110 which may preferably be controlled to tune each resonator to a desired frequency or frequency range as discussed further herein. As shown in FIG. 2, the capacitively coupled bar 106 may include a variety of thickness and/or heights to control the amount of voltage capacitively applied to each respective resonator 102, 104 by the capacitively coupled bar 106. In the example shown, the capacitively coupled bar 106 includes one thicker, raised section 109 and a thinner, lower section 111.

Figure 3:
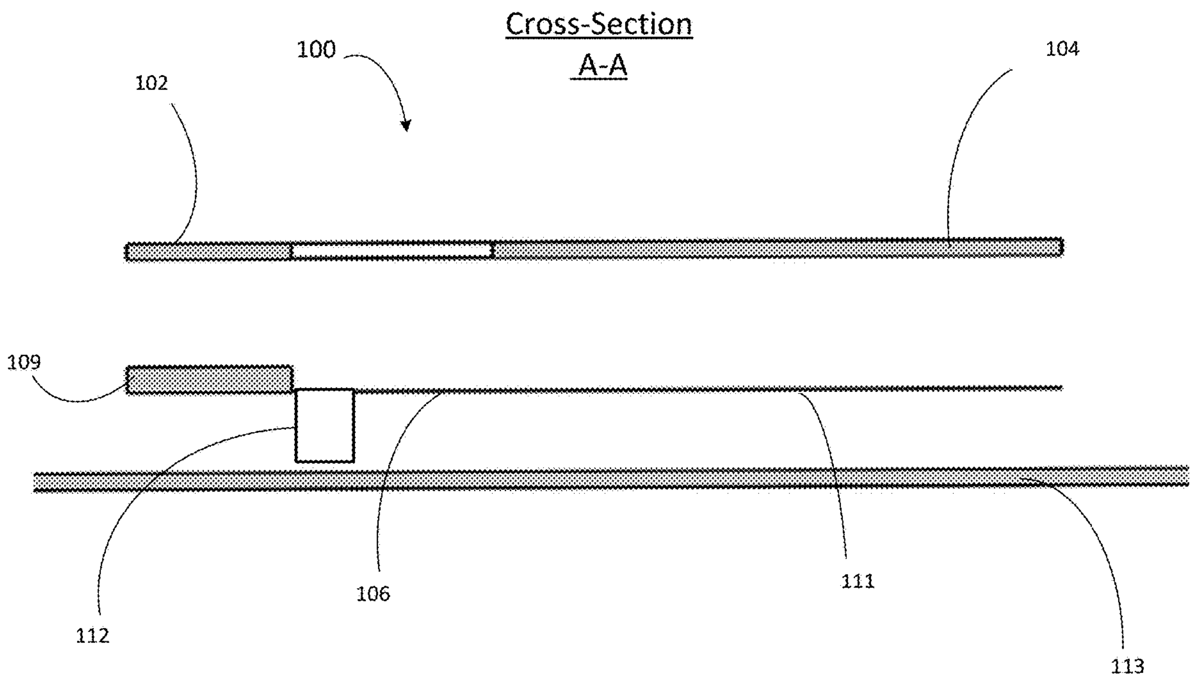
FIG. 3 is a cross-section of the antenna assembly shown in FIG. 1 cut along the line A-A.

With reference now to FIG. 3, a cross-section of the antenna assembly 100 shown in FIG. 1 (cut along the line A-A) is provided. As shown, the capacitively coupled bar 106 is preferably attached to a feed pin 112 to provide the charging inputs. Further, a ground plane 113 is shown which preferably may be formed from or within a printed circuit board (PCB).

Figure 4:
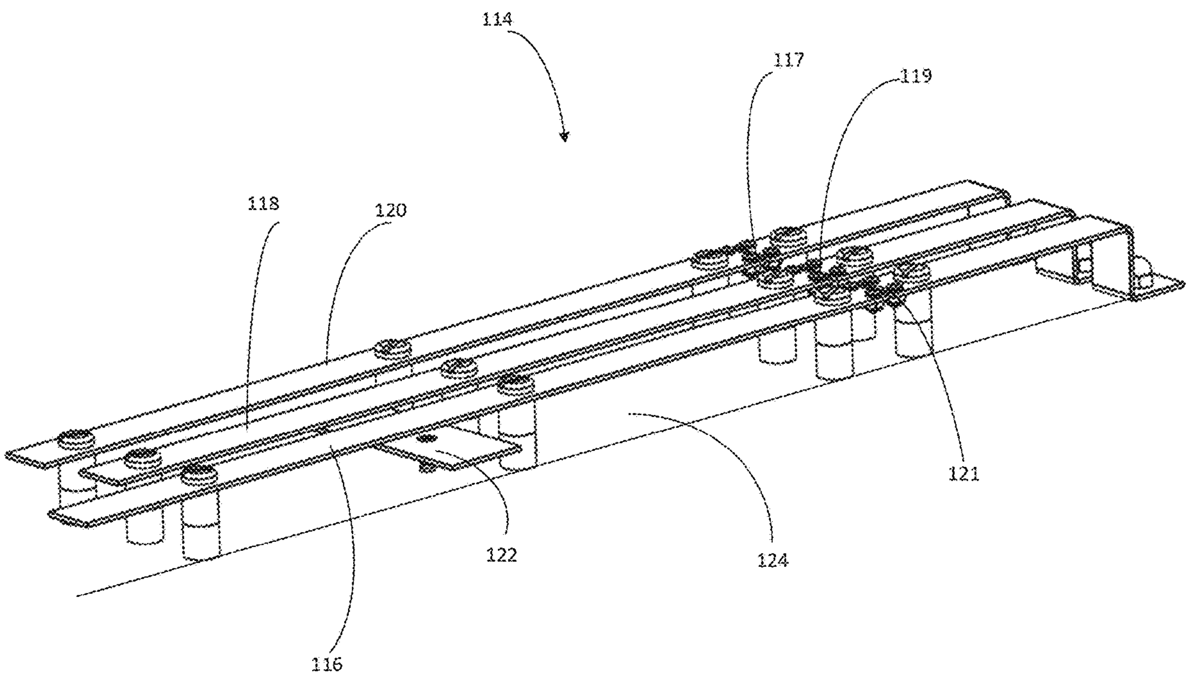
FIG. 4 is a perspective view of an antenna assembly according to a second embodiment of the present invention.
Figure 5:
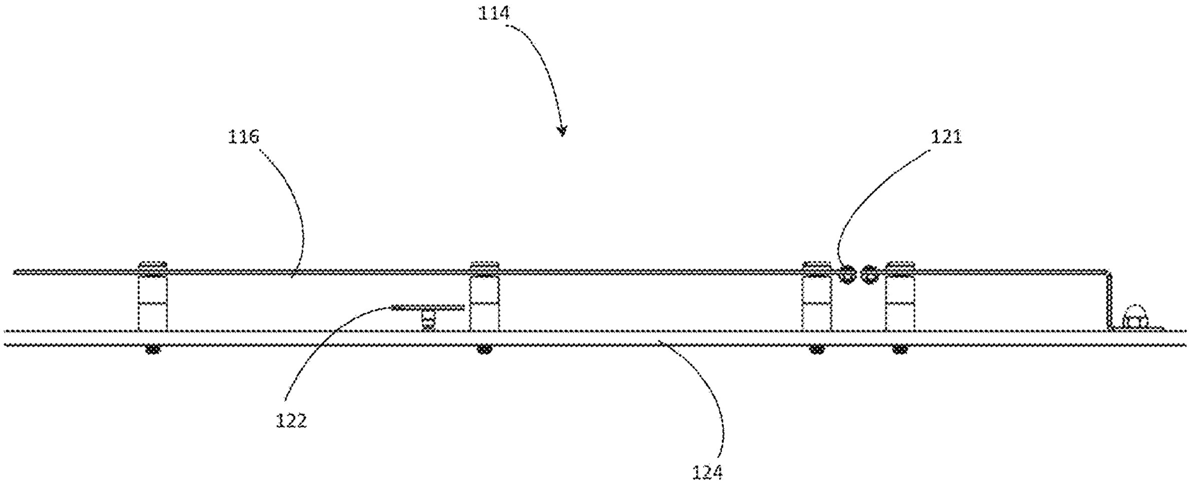
FIG. 5 is a side view of the antenna assembly shown in FIG. 4.

Referring now to FIGS. 4 and 5, an antenna assembly according to a second embodiment 114 of the present invention shall now be discussed. As shown, according to the second preferred embodiment, the antenna assembly 114 may include multiple resonators 116, 118, 120 for transmitting and/or receiving electro-magnetic signals. For example, one band may use two resonators and a second band may be supported by a single resonator. In the example shown, the antenna assembly 114 (attached to ground plane/PCB 124) may include first and second transmission resonators 118, 120 and a third resonator 116 for receiving signals. As shown, each of the resonators 116, 118 and 120 may preferably receive tuning inputs via at least one capacitively coupled bar 122. Additionally, one or more of the resonators 116, 118 and 120 may preferably also include transducer elements/circuits 117, 119, 121 which preferably are controlled to further tune each resonator within a desired frequency range.

Figure 6:
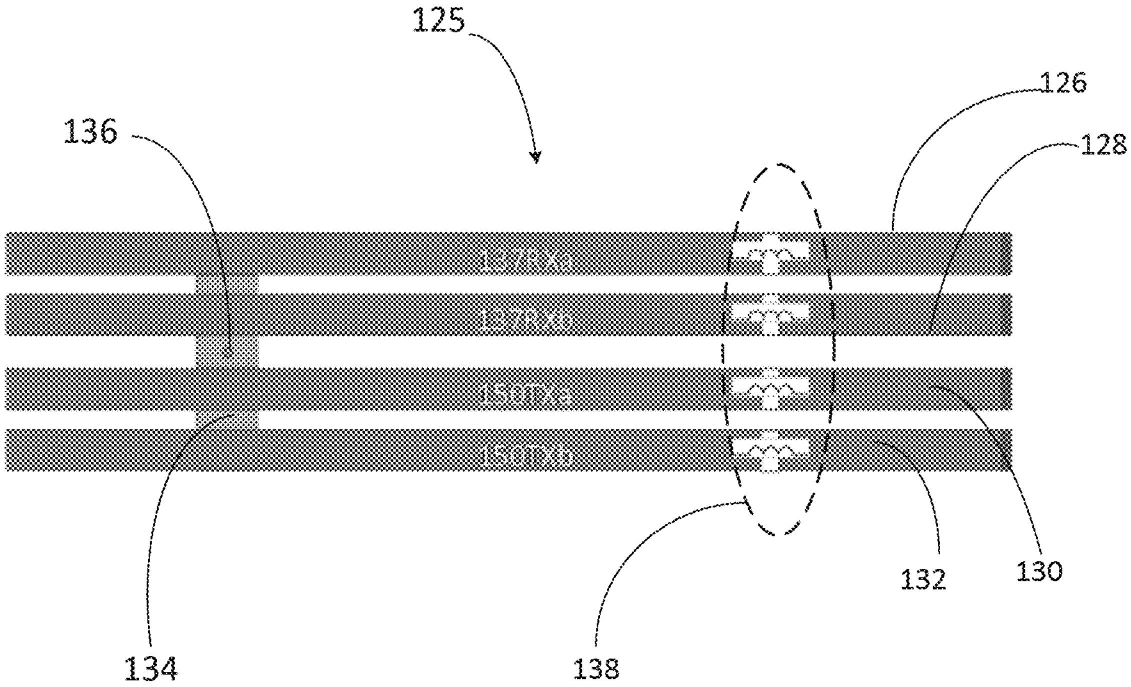
FIG. 6 is a schematic view of an antenna assembly in accordance with a second preferred embodiment of the present invention.
Figure 7:
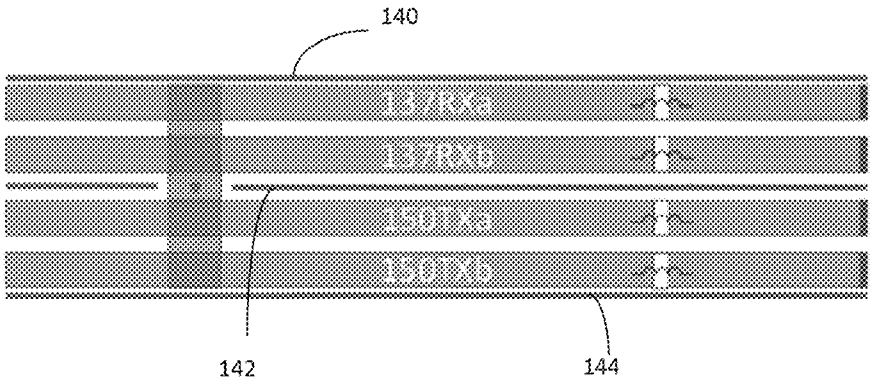
FIG. 7 is a schematic view of the antenna assembly shown in FIG. 6 with grounding strips between resonating elements.

With reference now to FIG. 6, a schematic view of an antenna assembly 125 in accordance with a third preferred embodiment is provided. As shown, the antenna assembly 125 may include multiple resonators for both transmitting and receiving EM signals. In the example shown in FIG. 6, low frequency array ground bars 126 128 may preferably be provided as receiving resonators. Additionally, high frequency array ground bars 130, 132 may preferably be provided as transmission resonators. Each element may preferably be formed on a common PCB and may preferably each receive EM inputs from at least one capacitive feed bar 134 connected to at least one feed pin 136. According to alternative embodiments, each resonator 126-132 may preferably further be selectively attached to one or more inductive elements/loads 138. Additionally, as shown in FIG. 7, grounding strips 140, 142, 144 (or other dielectric material, walls or spacing elements) may selectively run between resonating elements.

Figure 8:
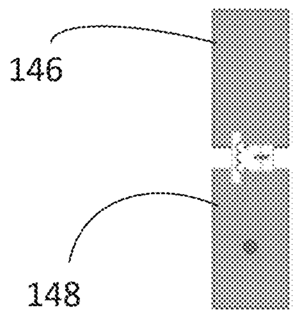
FIG. 8 is a schematic view of an example capacitively coupled bar for use with the present invention.
Figure 9:
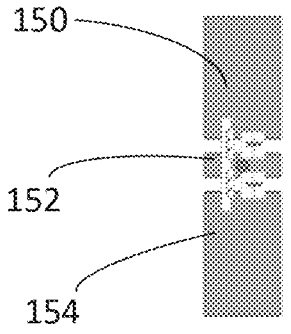
FIG. 9 is a schematic view of a further example capacitive coupled bar for use with the present invention.

With reference now to FIGS. 8 and 9, according to alternative preferred embodiments, each capacitively coupled bar for use with the present invention may be segmented and/or multiple independently controllable capacitively coupled bars (CCB) or bar segments may be used to influence different resonators. As shown in FIGS. 8 and 9, two CCB segments 146, 148 may be used, or three or more CCB segments may be used 150, 152, 154. Custom inductor ($L_{RX}$ and $L_{TX}$) values for different applications may preferably be selectively applied and/or adjusted for one or more resonators as well. According to further preferred embodiments, the tuning elements of the present invention may further be actively tuned based on a variety of sensor inputs such as a Received Signal Strength Indicator (RSSI) or the like.

According to further alternative embodiments, one or more resonators may be dedicated to further bands such as L-band satellite to make the antenna array dual mode. Still further, a resonator may be dedicated to an AIS (Automatic Identification System) frequency to make the array tri-mode.

The present invention has been disclosed above with reference to several examples. These examples are not intended to be limiting. Instead, the scope of the present invention should be determined purely by the terms of the appended claims and their legal equivalents.

What is claimed is:

1. A capacitively coupled antenna array assembly, wherein the antenna array assembly comprises:

a first receive resonator;

a first transmit resonator;

a coupled bar orthogonally disposed to each of the first receive resonator and the first transmit resonator;

wherein the first receive resonator and the first transmit resonator are capacitively fed by the coupled bar;

wherein the first receive resonator is formed as an inverted-L antenna;

wherein the first transmit resonator is formed as an inverted-L antenna;

a first inductor element coupled to the first resonator, and a second inductor element coupled to the first transmit resonator, wherein the first inductor element and the second inductor element are configured to tune each resonator to a respective desired frequency; and a feed pin, wherein the feed pin is attached to the capacitively coupled bar to provide charging inputs to the first receive resonator and the first transmit resonator.

2. The antenna array assembly of claim 1, wherein the coupled bar is orthogonally disposed near a center of each of the first receive resonator and the first transmit resonator.

3. The antenna array assembly of claim 1, wherein the capacitively coupled bar comprises a first section having a first thickness and a second section having a second thickness; wherein the first thickness is greater than the second thickness.

4. The antenna array assembly of claim 3, wherein the first section is raised relative to the second section.

5. The antenna array assembly of claim 1, wherein the antenna array assembly comprises a third resonator.

6. The antenna array assembly of claim 5, wherein the coupled bar is orthogonally disposed to the third resonator.

7. The antenna array assembly of claim 6, wherein the coupled bar is orthogonally disposed near a center of the third resonator.

8. The antenna array assembly of claim 5, wherein the third resonator comprises a second transmission resonator.

9. The antenna array assembly of claim 5, wherein the third resonator comprises a second receiving resonator.

10. The antenna array assembly of claim 9, wherein the antenna array assembly further comprises a plurality of transducer elements.

11. The antenna array assembly of claim 1, wherein the antenna array assembly further comprises:

a second receive resonator; and a second transmit resonator.

12. The antenna array assembly of claim 11, wherein the first and second receive resonators comprise low frequency array ground bars.

13. The antenna array assembly of claim 12, wherein the first and second transmit resonators comprise high frequency array ground bars.

14. The antenna array assembly of claim 13, wherein the antenna array assembly further comprises a plurality of grounding strips; wherein at least one grounding strip is attached between a first pair of resonating elements.

15. The antenna array assembly of claim 11, wherein the capacitively coupled bar is segmented.

16. The antenna array assembly of claim 15, wherein the capacitively coupled bar comprises multiple independently controllable bar sections.

17. The antenna array assembly of claim 11, wherein antenna array assembly comprises a plurality of independently controllable capacitively coupled bars (CCB).

18. The antenna array assembly of claim 11, wherein at least one resonator is dedicated to the L-band to make the antenna array dual mode.

19. The antenna array assembly of claim 18, wherein at least one resonator is dedicated to an AIS (Automatic Identification System) frequency to make the array tri-mode.

* * * * *